(No Model.) 2 Sheets—Sheet 2.

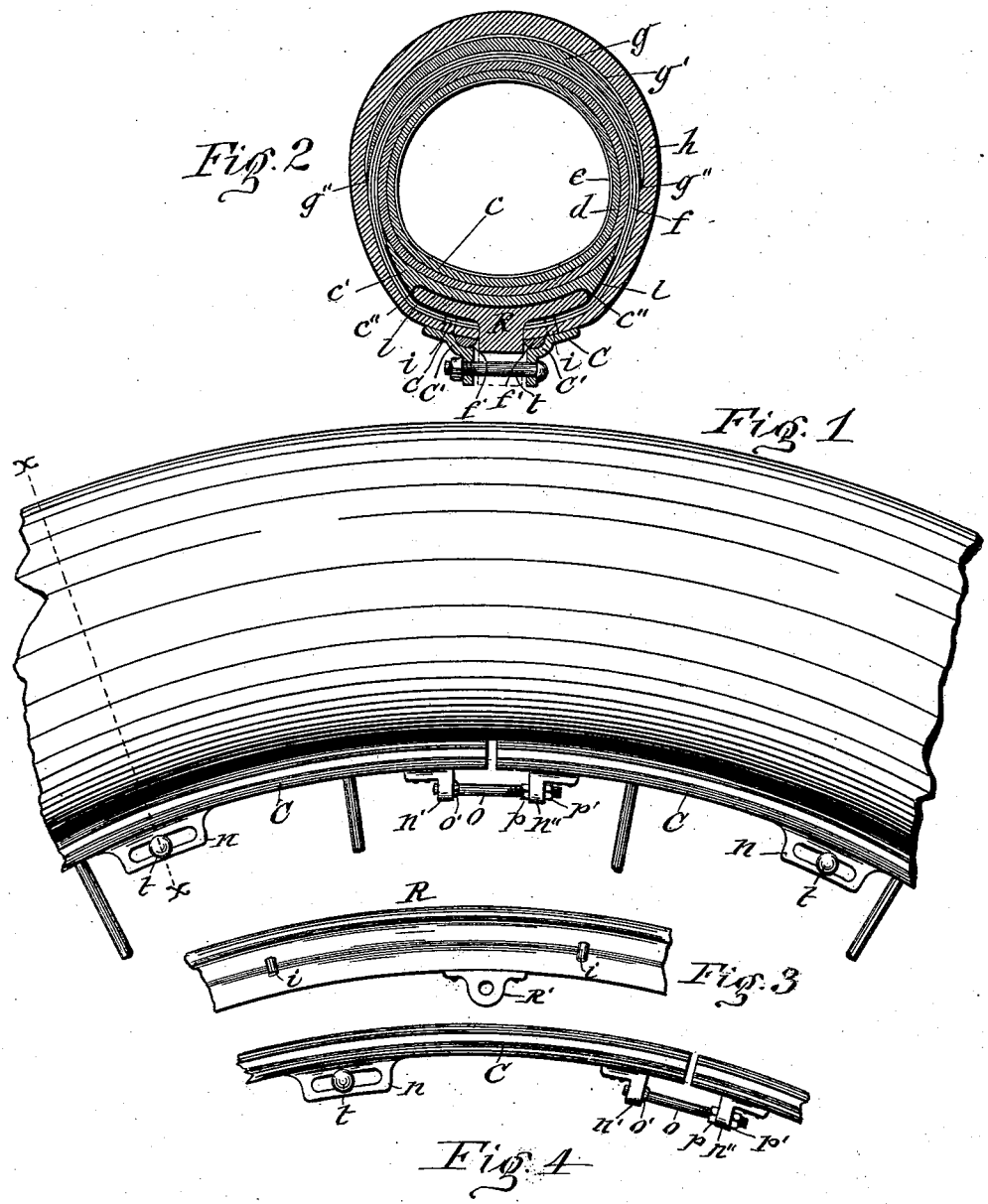

E. G. DORCHESTER.
BICYCLE TIRE.

No. 472,786. Patented Apr. 12, 1892.

WITNESSES:
J. J. Laass.
Mark W. Dewey

INVENTOR:
Edward G. Dorchester
By Hull, Laass & Hull
his ATTORNEYS.

UNITED STATES PATENT OFFICE.

EDWARD G. DORCHESTER, OF GENEVA, NEW YORK.

BICYCLE-TIRE.

SPECIFICATION forming part of Letters Patent No. 472,786, dated April 12, 1892.

Application filed October 24, 1891. Serial No. 409,710. (No model.)

*To all whom it may concern:*

Be it known that I, EDWARD G. DORCHESTER, of Geneva, in the county of Ontario, in the State of New York, have invented new and useful Improvements in Bicycle-Tires, of which the following, taken in connection with the accompanying drawings, is a full, clear, and exact description.

This invention relates to the class of bicycle-tires usually termed "pneumatic;" and it consists of an inflatable rubber tube applied to the periphery of the wheel; and the invention consists, first, in an improved construction of said tire in which are combined greater stability and durability with the requisite elasticity, and, secondly, in improved means for more securely fastening the tire to the rim of the wheel, all as hereinafter fully described, and specifically set forth in the claims.

Figure 5:
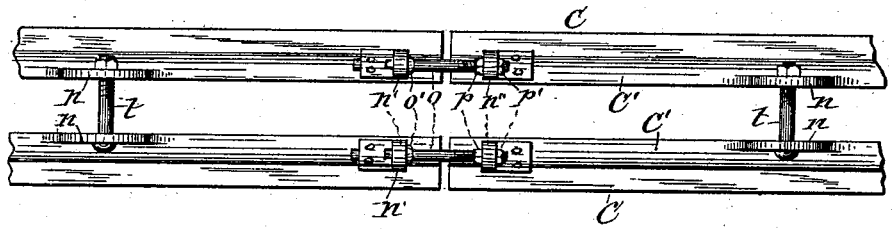
Figure 6:
Figure 7:
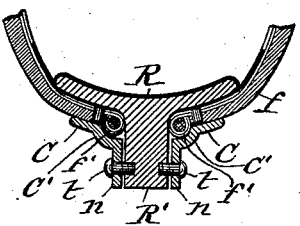
Figure 8:
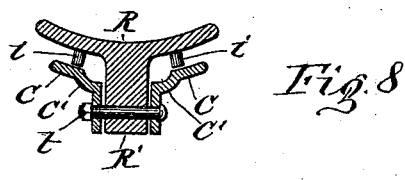

In the annexed drawings, Figure 1 is a side view of a section of said tire and its connection with the rim of the wheel. Fig. 2 is a transverse section on line $x\ x$, Fig. 1. Fig. 3 is a side view of a section of the rim of the wheel minus the tire. Fig. 4 is a detached side view of a section of the tire-clamping hoop. Fig. 5 is a plan view of the inner side of said hoop; and Figs. 6, 7, and 8 are transverse sectional views of modifications of the attachment of the said hoop.

Similar letters of reference indicate corresponding parts.

R represents the metallic rim of the wheel, usually formed concave on its exterior to serve as a seat for the inflatable rubber tube $c$. This tube is subjected to the greatest strain along the portions adjacent to the edges of the rim R when the bicycle is in use. To enable the tube to better resist this strain and at the same time seat the same more securely on the rim R, I reinforce and cushion the tube $c$ by an additional thickness or layer $c'$ of rubber interposed between the tube and rim and either vulcanized or cemented to the tube. Said reinforcement extends beyond the edges of the rim R and is formed with longitudinal ribs $c''$, by which it embraces the edges of the rim, and thus holds the tube in its place. I further reinforce the tube $c$ by an additional soft-rubber tube $d$, inserted into the tube $c$ and secured therein by compression of the inner tube endwise thereof and cemented either to the outer tube $c$ or to a canvas lining $e$, inserted into the inner tube to retain it in its compressed condition.

$f$ denotes the sheath, which is composed of one or more layers of canvas enveloping the rubber tube $c$ and secured to the rim R in the manner hereinafter described. This sheath I reinforce and cushion on its outer side or tread by a layer $g$ of either rubber or felt, which I cover with canvas $g'$ of sufficient width to lap part way onto the sheath $f$, to which it is sewed, as indicated by $g''\ g''$. The tire thus far prepared I envelop in a coat $h$ of either leather or rubber of a suitable quality to withstand the wear of the road.

The aforesaid sheath $f$ and coat $h$ I firmly secure to the rim R in the following manner: To the inner side of said rim I rigidly secure lugs or spurs $i\ i$, and the longitudinal marginal portions of the sheath I lap onto the inner side of the rim R and provide the lapping portions of the sheath with eyelets, through which the spurs $i\ i$ pass, and thus retain the sheath on the rim. To protect the sheath from wear and abrasion at the edges of the rim R, I interpose linings $l\ l$, of canvas, between said parts. The spurs $i\ i$ passing through said lining hold the same in place. The linings may be in one piece extending between the rim and cushion $c'$ and over the sides of the rim and then folded back toward the tube and cemented thereto.

The longitudinal marginal portions of both the sheath $f$ and coat $h$ I clamp between the rim R and hoops C C, which are fluted on the side adjacent to the rim, as shown at $C'\ C'$. The edges of the sheath are enlarged in thickness, as shown at $f'\ f'$, either by strips of leather sewed thereon and rounded, as represented in Fig. 2 of the drawings, or by cords enveloped and secured in the edges of the sheath, as represented in Fig. 7 of the drawing. Said enlargements of the sheath, being held in the fluted portions of the clamping-hoops C C, serve to securely confine the edges of the sheath on the rim R. The said clamping-hoops are united by means of suitable ties $t$, which may be formed in various ways. The hoop may be formed with perforated ears $n\ n$, through which the tie or clamping bolt passes. By means of a nut on the end of said bolt the hoops can be drawn tightly together, as shown in Fig. 2 of the drawings, and in that case I prefer to provide the inner side of the rim R with perforated lugs R', through which the bolt $t$ passes, as shown in Fig. 8 of the drawings. Said lugs may be bolted onto the rim or otherwise firmly secured, as represented in Fig. 3 of the drawings; or in lieu of the single bolt two set-screws $t\ t$ may be employed said screws entering screw-threaded sockets in the lug R', as shown in Fig. 7 of the drawings.

Another form of tie is shown in Fig. 6 of the drawings, and consists of a metal strap $t$, placed across the two adjacent portions of the hoops and secured thereto by rivets or bolts.

In order to allow the hoops C C to be forced outward and tightly against the marginal portions of the sheath $f$ and coat $h$, I make said hoops expansible by forming them of separate segments provided at their ends with perforated ears $n'\ n''$, through which passes a bolt $o$, which is provided with a shoulder $o'$, abutting against the ear $n'$ at the side facing the opposite ear $n''$. The opposite end of the bolt is screwed-threaded and provided with a nut $p$ between the ears. By turning this nut so as to cause it to move toward the ear $n''$ the segments of the hoops are forced from each other, and thus the circumference of the hoop is enlarged. If desired, a jamb-nut $p'$ may be applied to the end of the bolt $o$.

To permit of the aforesaid expansion of the hoops C C, I elongate the eyes of the ears $n\ n$ on said hoops, as shown in Fig. 4 of the drawings.

Having described my invention, what I claim as new, and desire to secure by Letters Patent, is—

1. A pneumatic tire composed of two tubes disposed one within the other and the inner tube compressed endwise and a canvas lining cemented to the inner tube to retain the same in its compressed condition, as set forth.

2. A wheel-tire consisting of two rubber tubes arranged one within the other and the inner tube compressed lengthwise, a lining secured to the inner tube to retain the same compressed, and a sheath enveloping the exposed portion of the outer tube, as set forth.

3. In combination with the wheel-rim, two rubber tubes arranged one within the other and the inner compressed lengthwise, a lining secured to the inner tube, a reinforcing-layer interposed between the outer tube and wheel-rim, and a sheath enveloping the outer tube and lapping onto the inner side of the wheel-rim and secured thereto, as set forth.

4. In combination with the wheel-rim and rubber tube, a sheathing enveloping said tube and secured to the rim, a rubber or felt cushion on the tread of the outer tube, a canvas cover over said cushion and secured to the sheathing, and a rubber coat over said cover and sheathing and secured thereto, as set forth.

5. The combination, with the wheel-rim and the rubber tube seated entirely upon the exterior of said rim, of the sheathing enveloping said tube and lapping onto the inner side of the rim, clamping-hooks placed upon the lapping portions of the sheathing, and ties uniting said hoops, as set forth.

6. The combination, with the wheel-rim and rubber tube, of the sheathing lapping onto the inner side of the rim, hoops composed of segments placed upon the lapping portions of the sheathing, expanding bolts interposed at the joints of said segments, and ties uniting said hoops, as set forth.

7. The combination, with the wheel-rim and rubber tube, of the sheathing lapping onto the inner side of the rim and having its edges enlarged in thickness, clamping-hoops placed upon the lapping portions of the sheath, and ties uniting said hoops, substantially as described and shown.

8. The combination, with the wheel-rim and rubber tube, of spurs projecting from the inner side of the rim, the sheathing lapping onto the rim and receiving the spurs through it, cords or bands attached to the edges of the sheath, clamping-hoops placed upon the lapping portions of the sheath, and ties uniting said hoops, as set forth and shown.

9. The combination, with the wheel-rim and rubber tube, of the sheathing lapping onto the inner side of the rim, clamping-hoops placed upon the lapping portions of the sheathing, perforated ears on the hoops and on the rim, and tie-bolts passing through said ears, as set forth and shown.

In testimony whereof I have hereunto signed my name this 17th day of October, 1891.

EDWARD G. DORCHESTER. [L. S.]

Witnesses:
 MARK W. DEWEY,
 H. M. SEAMANS.